No. 741,974. PATENTED OCT. 20, 1903.
E. B. MILLARD.
GRAIN SEPARATOR.
APPLICATION FILED JUNE 9, 1903.
NO MODEL. 2 SHEETS—SHEET 1.
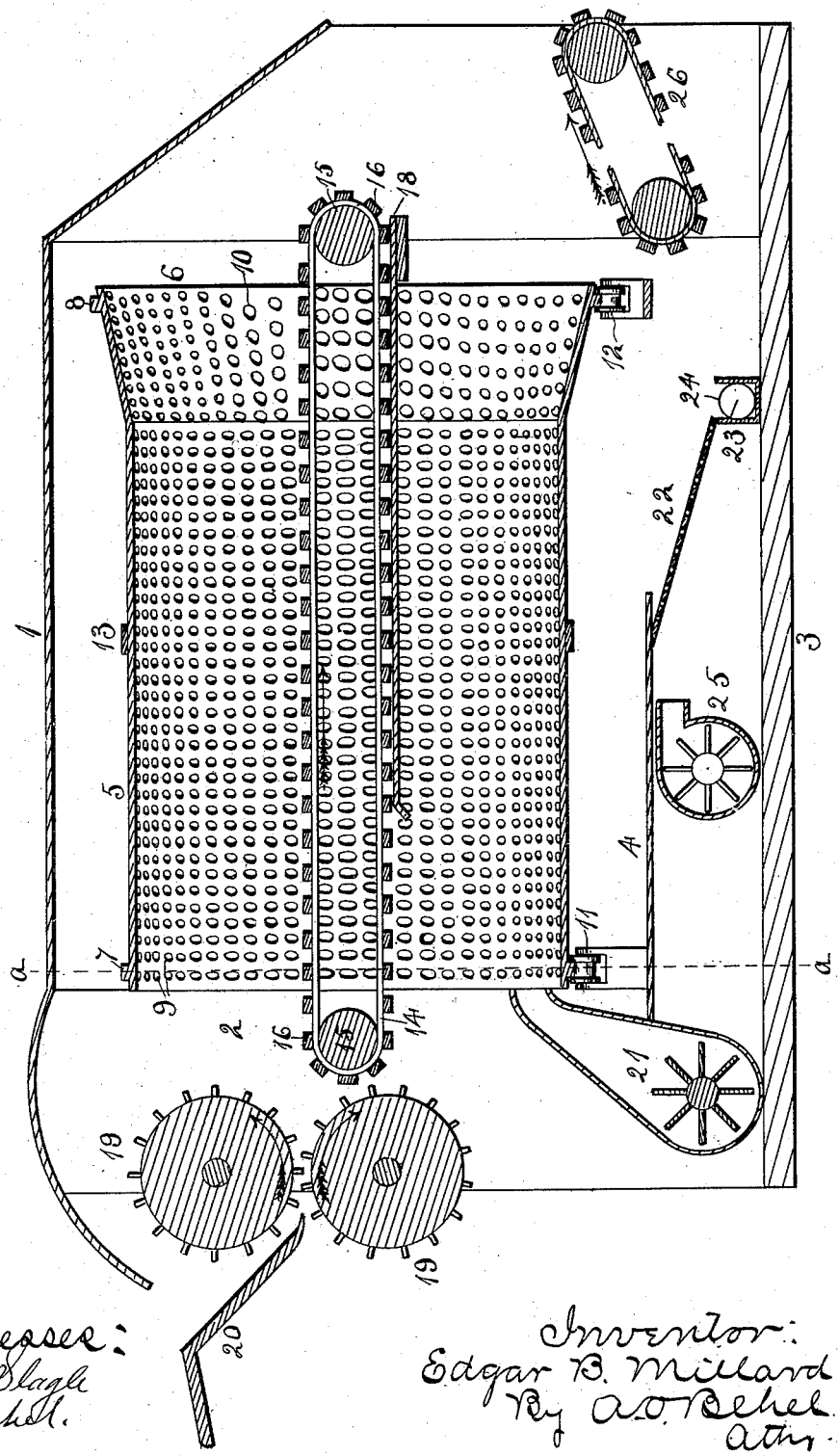
Witnesses:
H. J. Slagle
E. C. Behel
Inventor:
Edgar B. Millard
By A. O. Behel
Atty.

No. 741,974. PATENTED OCT. 20, 1903.
E. B. MILLARD.
GRAIN SEPARATOR.
APPLICATION FILED JUNE 9, 1903.
NO MODEL. 2 SHEETS—SHEET 2.
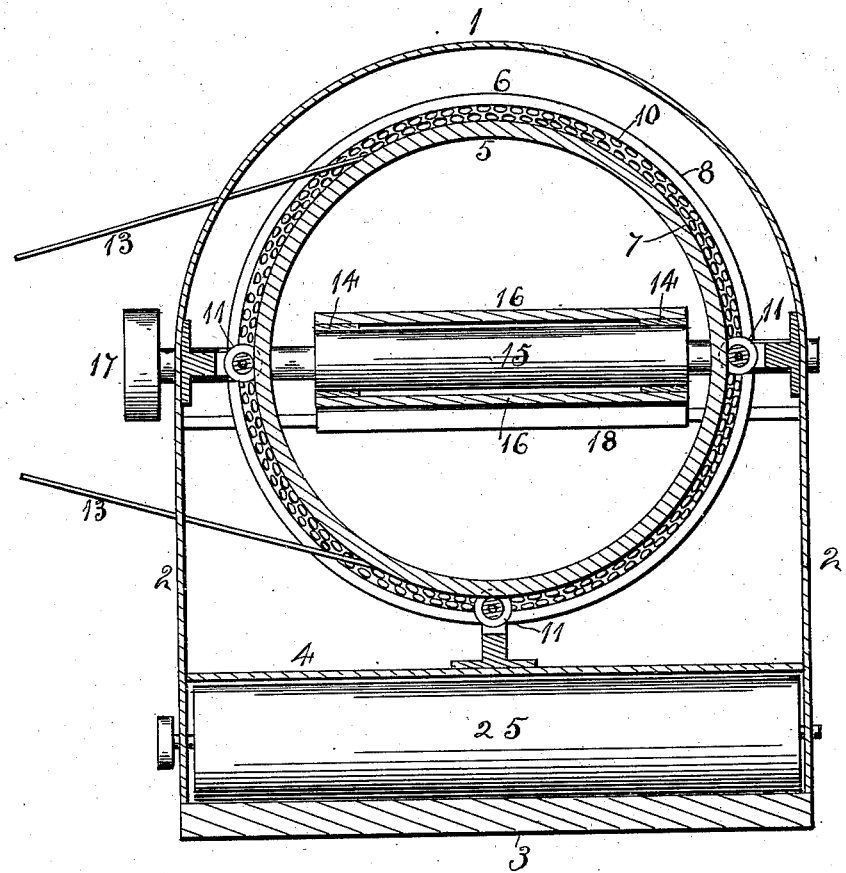

No. 741,974. Patented October 20, 1903.

UNITED STATES PATENT OFFICE.

EDGAR B. MILLARD, OF GENOA, ILLINOIS.

GRAIN-SEPARATOR.

SPECIFICATION forming part of Letters Patent No. 741,974, dated October 20, 1903.

Application filed June 9, 1903. Serial No. 160,751. (No model.)

*To all whom it may concern:*

Be it known that I, EDGAR B. MILLARD, a citizen of the United States, residing at Genoa, in the county of Dekalb and State of Illinois, have invented certain new and useful Improvements in Grain-Separators, of which the following is a specification.

The object of this invention is to construct a grain-separator comprising a revolving perforated cylinder within which is located an endless carrier in order that the small grains may fall through the carrier and the straw be discharged at the opposite end of the carrier.

In the accompanying drawings, Figure 1 is a lengthwise vertical section. Fig. 2 is a transverse section on dotted line *a*, Fig. 1.

The main frame in this instance comprises the top 1, sides 2, and bottom 3. A chaff-board 4 is held supported by the sides of the main frame.

A cylinder 5 has a bell-shaped end 6 and two exterior rings 7 and 8, located near the ends of the cylinder. The main portion of the cylinder has elongated perforations 9, their length extending around the cylinder. The bell-shaped end 6 of the cylinder has circular perforations 10 of greater area than the elongated perforations 9. That end of the cylinder having the ring 7 is supported by three grooved rollers 11, embracing the ring, and the bell-shaped end of the cylinder is supported by three grooved rollers 12, embracing the ring 8. In this instance the cylinder 5 is driven by a belt 13, located around it and driven by some moving part of the device. An endless carrier is located within the cylinder and comprises the belts 14, supported by rollers 15 at each end, and a series of cleats 16, connecting the belts. The rollers 15 are supported by the main frame, and one is driven by the pulley 17, having a belt connection with the other moving parts of the device. The ends of the carrier extend beyond the ends of the cylinder. Beneath this carrier is located a board 18, over which the cleats of the carrier move in their return movement. Near the feed end of this endless carrier are located two toothed threshing-cylinders 19, capable of being driven at different speeds. A feed-board 20 is located with reference to the cylinders to feed the grain between them. A blower 21 has its discharge end so located to deliver an air-blast into the lower portion of the separating-cylinders.

A screen 22 is located at the discharge end of the chaff-board 4 and discharges into the trough 23, within which is located a conveyer 24. A fan 25 is located beneath the screen 22.

A rattle-rake 26 has its receiving end located beneath the discharge end of the endless carrier.

The grain to be threshed is fed between the cylinder 19, by which the seeds are liberated, and the seeds and straw thrown onto the endless carrier located within the separating-cylinder. This endless carrier being composed of open slats, the grain will fall through onto the board 18, the return movement of the carrier will move the grain off the end of the board and drop it onto the lower inner surface of the separating-cylinder, and such grains that do not pass through the elongated perforations will be carried up by the cylinder and dropped onto the endless carrier and repeat this operation until the grains are separated from the straw. The fan 21 will carry the lighter particles out the discharge end of the separating-cylinder. As the seeds and such fine particles mixed therewith move down the screen 22 the blower 25 will separate them. The seeds will enter the trough 23 and be conveyed to an elevator, by which they are elevated into the wagon. The rattle-rake 26 will carry the straw and other fine particles away from the machine. Such seeds and particles adhering thereto that may pass through the openings in the bell-shaped end of the separating-cylinder and that may be discharged from the cylinder may be returned to the feed-board of the machine and again run through the separating process.

I claim as my invention—

1. In a grain-separator, the combination of a perforated revoluble cylinder, having a bell-shaped discharge end, and an open endless carrier located within the cylinder, the cylinder and bell-shaped discharge end provided with perforations.

2. In a grain-separator, the combination of a perforated revoluble cylinder, an open endless carrier located within the cylinder and a board located beneath the carrier over which the carrier moves in its return movement.

EDGAR B. MILLARD.

Witnesses:
A. O. BEHEL,
E. BEHEL.